Feb. 17, 1953     T. C. LLOYD ET AL     2,629,076
SUBMERSIBLE TRANSFORMER AND ELECTRIC MOTOR AND COMBINATION
Filed May 20, 1949     2 SHEETS—SHEET 1
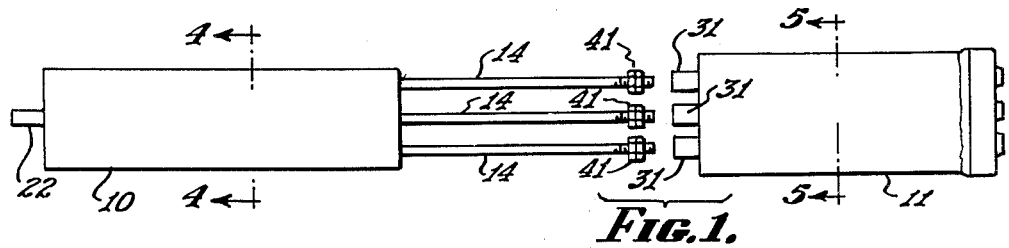
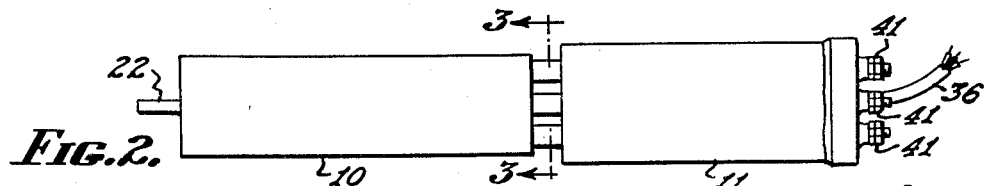
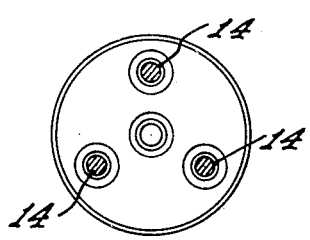 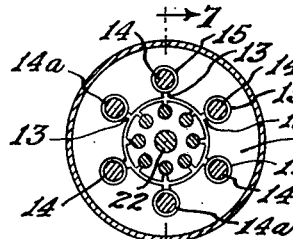 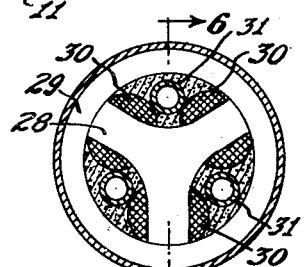
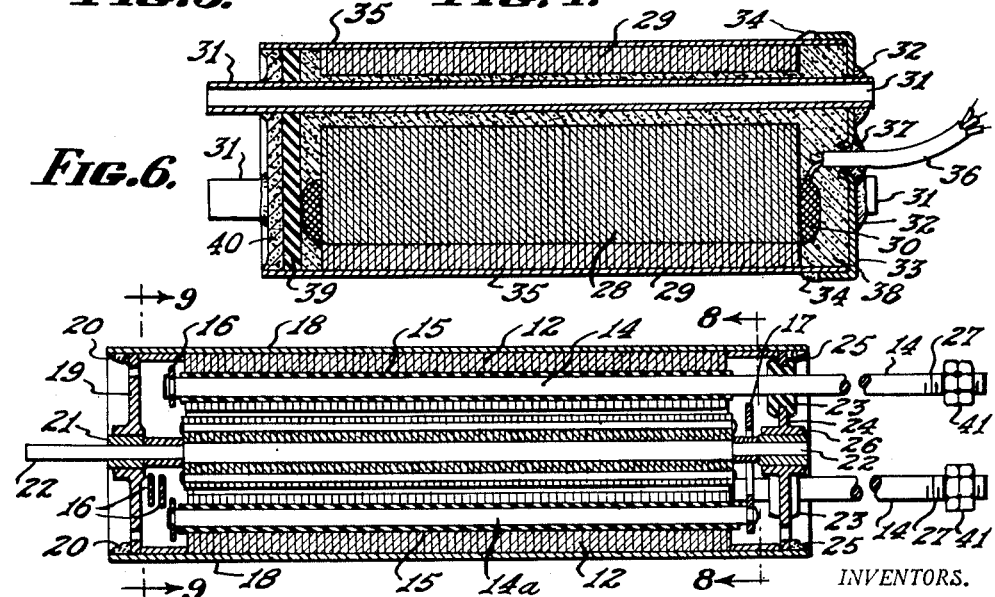
INVENTORS.
Tom C. Lloyd
And Sheldon S. L. Chang,
BY Allen + Allen
ATTORNEYS.

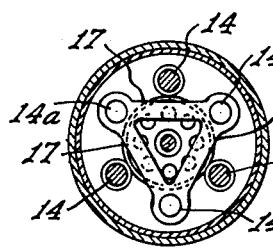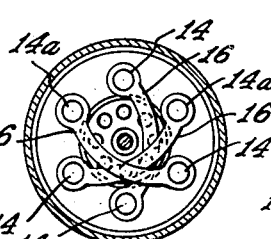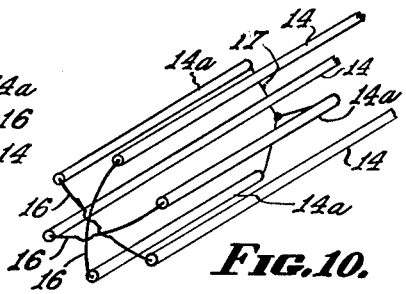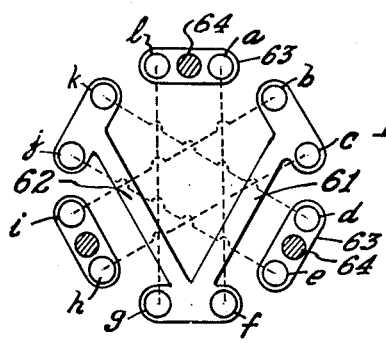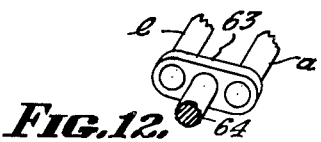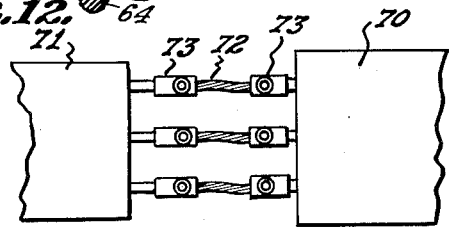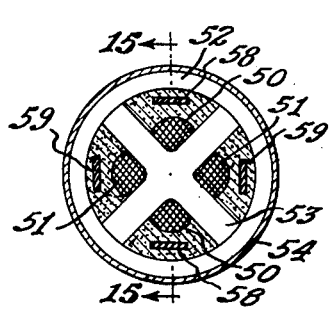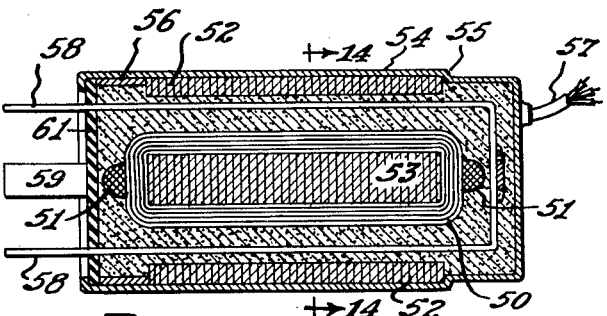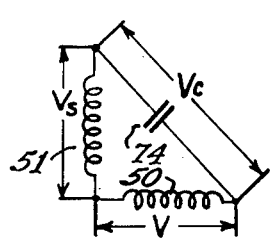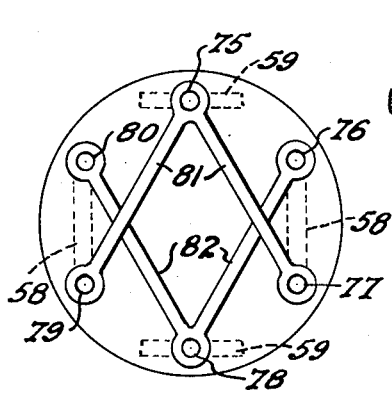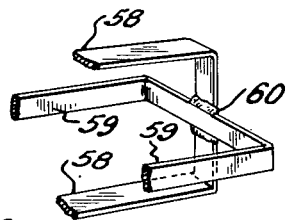

Patented Feb. 17, 1953

2,629,076

UNITED STATES PATENT OFFICE 2,629,076

SUBMERSIBLE TRANSFORMER AND ELECTRIC MOTOR AND COMBINATION

Tom C. Lloyd and Sheldon S. L. Chang, Springfield, Ohio, assignors to Robbins & Myers, Inc., Springfield, Ohio, a corporation of Ohio Application May 20, 1949, Serial No. 94,422

3 Claims. (Cl. 318—230)

This invention relates to a submersible electric transformer and motor and the combination of the two. It is often necessary to operate an electric motor under water or in oil. This is particularly true in the case of electric motors such as are used in connection with deep well pumps and the like. Underwater operation is very hard on the motor in that, over a period of time the insulation on the wires in the motor and the insulation which insulates the wires from the frame, deteriorates. It has been found that this is true no matter whether the motor is submerged in ordinary water, sea water, or even crude oil, because of the impurities which the liquid may contain. Deterioration of insulation of course results in losses and in short circuits of the core windings and eventually in complete failure. Failure may be hastened by abrasive materials in the surrounding fluid, particularly if the fluid is in motion. Furthermore, where areas of windings carrying a current at a high enough electrical potential will produce ionization of the fluid, as for example salt water, the resulting electro chemical action will produce further loss in energy from the electric circuit.

Various ways have been proposed in the past to overcome the difficulties outlined above, and the problem has generally been solved in one of two ways. According to one way the motor is enclosed and sealed against the surrounding fluid. This solution of course presupposes a sealing of a revolving shaft against the casing, and, since no perfect seal has ever been devised and since all seals in time deteriorate, the circumambient liquid ultimately gets into the motor and produces the deleterious results discussed above.

According to another method the high voltage field winding is isolated from the rotor by means of a metal shield or the like, and sealing compounds are carefully poured so that the high voltage field winding is completely sealed. The rotor rotates inside the thin metal tube in the air gap, and this portion of the motor is exposed to clean water inside the motor. However the water inside the motor is gradually contaminated because of the trouble in connection with seals discussed above. Furthermore, this system is objectionable because of the effect of the thin metal tube in the air gap. It carries eddy current losses and results in increased air gap lengths and inferior motor performance.

Thus neither of the two most practical methods heretofore employed have proved a completely acceptable solution to the problem. It is therefore an object of the present invention to solve the problems above outlined by the provision of a submersible electric motor which will not be subject to any of the objections discussed above.

It is a further object of the present invention to provide a transformer which will cooperate in a novel manner with the motor of the present invention.

Yet another object of the invention is the provision of a combination between a transformer of a certain construction and a motor of a certain construction combined in a novel manner whereby the objections above outlined are overcome.

These and other objects of the invention which will be pointed out in more detail hereinafter or which will be apparent to one skilled in the art upon reading these specifications, we accomplish by that construction and arrangement of parts of which we shall now describe certain exemplary embodiments.

Reference is made to the drawings forming a part hereof and in which:

Figure 1 is an elevational view of an electric motor and transformer according to our invention before coupling together;

Figure 2 is a view similar to Figure 1 showing the motor and transformer coupled together;

Figure 3 is a cross sectional view on a slightly enlarged scale taken on line 3—3 of Figure 2;

Figure 4 is a view similar to Figure 3 taken on the line 4—4 of Figure 1;

Figure 5 is a view similar to Figures 3 and 4 but taken on the line 5—5 of Figure 1;

Figure 6 is a longitudinal cross-sectional view through the transformer taken on the line 6—6 of Figure 5, and, Figure 7 is a longitudinal cross-sectional view through the motor taken on the line 7—7 of Figure 4;

Figure 8 is a cross-sectional view taken on the line 8—8 of Figure 7;

Figure 9 is a cross-sectional view taken on the line 9—9 of Figure 7;

Figure 10 is a perspective diagrammatic view of the six bars in the stator showing the manner in which they are interconnected;

Figure 11 is a diagrammatic end view of a stator wherein there are twelve bars instead of six, showing the manner in which the bars are interconnected;

Figure 12 is a fragmentary perspective view of the other end of a pair of bars as shown in Figure 11;

Figure 13 is a fragmentary elevational view of a motor and transformer showing a modified way of interconnecting them;

Figure 14 is a cross-sectional view taken on the line 14—14 of Figure 16 showing a modified construction;

Figure 15 is a cross-sectional view taken on the line 15—15 of Figure 14;

Figure 16 is a fragmentary perspective view showing the interconnection of the bars at the right hand end of Figure 15;

Figure 17 is a diagram useful in understanding the disclosures of Figures 14 and 16 inclusive, and Figure 18 is a diagrammatic view of the connection in a motor which may be used with the transformer of Figures 14-17.

Briefly, in the practice of our invention we provide an electric motor designed to operate on an extremely low voltage, say 1 or 2 volts. In a conventional stator winding of a polyphase induction motor, for example, there might be many coils suitably distributed in slots around the inside bore of the laminated field. Each coil might contain anywhere from 10 to perhaps 200 turns of wire depending upon the design and rating of the motor. When suitably connected there may be several hundred or thousand turns of wire in series connected to the supply lines. If the voltage for a given motor is to be one-half as much as the voltage of another motor, the number of turns of wire in the field is cut in half. In order to obtain the same power output the current consumed by the motor will be twice as much as before. If this reduction is carried on until the turns per coil reduce to one and the number of slots in the field are reduced so that the combination of one-turn coils arrived at is correct for operation at about one or two volts, then the conventional multiturn field or stator winding of many slots is reduced to a few heavy bars of conducting material which may suitably be connected together in various combinations and supplied by a low voltage transformer.

Many advantages would flow from such a construction, but another difficulty presents itself; and that has to do with the supply of low voltage current to this motor which may be at the bottom of a deep well. To carry a voltage of one or two volts with an amperage of several thousand amperes to the bottom of say a five-hundred foot well might require cable several inches in diameter and the transmission losses would still be extremely high.

We have solved this problem by providing for transformation of conventional voltages, say 115, 230 or 440 volts, etc. directly at the motor, to one or two volts by conventional transformation principles but using a transformer having a single turn secondary. With a transformer as outlined above the primary is supplied at standard voltages with standard cables, and the transformer itself can be entirely sealed since it has no moving parts and may, if desired, be hermetically sealed in a can or casing. The low voltage end of the transformer can be connected directly to the low voltage field of the motor so that the windings of the motor require no sealing and may operate in submerged condition.

Referring now in more detail to the drawings, we have indicated a motor generally by the numeral 10 and transformer by the numeral 11. For deep well purposes the motor and transformer are preferably tubular in shape and of considerable length in relation to their diameter. Thus in Figure 4 we have shown at 12 a lamina of the motor stator. A series of these laminae stacked together, as best seen in Figure 7, constitute the stator of the motor. The assembled laminae 12 are slotted as at 13 and in these slots the field windings of the motor are disposed. These field windings comprise rods or bars 14 and 14a of copper or other suitable electrically conductive material. The bars 14 and 14a may, if desired, be insulated from the laminations 12 by insulating sleeves 15.

It will be noted that the bars 14 extend from the motor casing, while the bars 14a do not extend from the casing. A bar 14 and a bar 14a together constitute a turn of the motor field windings. At the left hand end of the motor as seen in Figure 7, the bars are interconnected by straps or jumpers at 16 in Figure 9. As there shown bar 14 is connected to corresponding bar 14a by a jumper 16. At the right hand end of the motor as seen in Figure 7 the bars 14a are connected together by means of a jumper 17. The jumper 17 thus constitutes the neutral point and may if desired be grounded. The connections outlined above may be clearly seen in the perspective diagrammatic representation of Figure 10.

The motor is enclosed in a casing 18 having an end plate 19 secured thereto as by welding at 20. The plate 19 is provided with a suitable bearing 21, for the motor shaft 22. At the right hand end of the motor the bars 14 are held by insulated grommets 23 in an end plate member 24 which is welded to the motor casing as indicated at 25. The member 24 is provided with a suitable bearing 26 for the other end of the motor shaft 22. The motor shaft 22 carries a suitable rotor which may be of conventional design and construction and which need not be described in detail here since it forms no part of the present invention.

The rods 14 which constitute portions of the field coils are extended towards the right in Figure 7 and may be threaded as indicated at 27 at their extremities.

Since the motor herein described operates on extremely low voltage there is no harm in permitting access of water to the interior. No shaft seals have been indicated and, as a matter of fact the end plates 19 and 24 may be perforated as shown, or they may even be spiders.

An exemplary transformer, suitable for use with the motor herein described, is indicated generally at 11. This transformer may have a core comprising a stack of generally Y-shaped laminae, the laminae being indicated at 28, and a stack of ring-shaped laminae indicated at 29. Upon each of the arms of the Y there is found a primary coil indicated at 30. The single turn secondary may comprise tube-like members 31. The tube-like secondary members 31 will be welded as at 32 to an end cap member 33 which in turn is welded as at 34 to the transformer casing 35. A supply line 36 enters through the end cap member 33 and is suitably sealed thereagainst as at 37. The interior of the transformer may be filled about the primary windings and around the secondary tubes with a sealing compound 38, and the left hand ends (as seen in Figure 6) of the tube members 31 are engaged by an insulating spacer member 39 having suitable holes therein. Additional sealing compound may be applied on the outside of the member 39 as indicated at 40.

The completed transformer therefore will comprise a unit which is completely sealed and the primary of which is supplied with a standard voltage which may be 115, 230, 440 or the like volts. The secondary of the transformer is constituted by a number of tubes of copper or other suitably electrically conductive material, and the copper tubes 31 are exposed.

The motor and transformer may be connected together as will be clear from Figures 1 and 2 by telescoping the rods 14 into the tubes 31 and securing the rods 14 on the other side of the transformer by means of suitable lock nuts as indicated at 41.

In practice, for example, if 110 volts are to be supplied, the transformer might have say 110 turns on the primary. With one turn on the secondary the secondary voltage would be one volt.

The particular transformer described above is a three-phase transformer, but it will be clear that the principles described herein are applicable to any desired transmission system whether it be single-phase or polyphase. The transformer tubes 31 would not need to be of electrically conductive material because the transformer would induce useful currents in the rods 14, but in this case the ends of the rods 14 would have to be electrically connected at the right end to complete the three-phase Y circuit. If, however, the tubes 31 are of conducting material, then the tubes, together with the rods therein, provide conductors of large cross section.

Since the motor windings are built up from heavy copper bars with brazed or welded connections they constitute a construction which is not likely to burn out. Where a construction is used as described herein with the motor and transformer as it were telescoped together, then it is very easy to detach the transformer from the motor for repair or service.

In Figures 14 to 17 inclusive we have shown a modification of the invention wherein both the transformer and the motor are provided with a main and an auxiliary winding. In Figures 14 and 15 the main primary winding of the transformer is indicated at 50, and the auxiliary primary winding is indicated at 51. In this case the transformer is provided with ring laminae 52 similar to the laminae 29 of Figure 5. However, instead of the Y-shaped laminae 28 of Figure 5 there are substituted the X-shaped laminae 53. The transformer of these figures is enclosed in a housing 54 which may be provided with the offset 55 against which the ring laminae 52 may abut and the ring laminae may be held in place at the left hand end by a spacer ring 56. In this instance the right hand end of the transformer is closed instead of being open as in Figure 6, and a lead-in for the primary current is provided at 57.

The secondary main and auxiliary windings comprise straps indicated respectively at 58 and 59. The straps 58 and 59 may be U-shaped and may be welded together as indicated at 60 in Figure 16. The ends of the members 58 and 59 extend out from the left hand end of the casing through an insulating closure member 61. The leads 58 and 59 may be connected to a motor in any desired manner.

The transformer of Figures 14 to 17 inclusive is useful in connection with a single phase induction motor of the permanent split capacitor type which can have the same general construction as the motor described in Figures 4 and 7. A schematic arrangement of the winding connection is shown in Figure 17.

At one end the motor stator bars 75, 77 and 79 are joined together by the V-shaped conductor 81 (Figure 18). The stator bars 76, 78 and 80 are joined together by the V-shaped conductor 82. At the other end, the bars 76, 77, 79 and 80 are connected in pairs to the transformer secondary 58, while the bars 75 and 78 are connected to the transformer secondary 59.

Figure 17 also shows the connections of the transformer primary windings to the source. The main winding 50 is connected directly across the source while the auxiliary winding 51 is connected across the source in series with a phase splitting element 74, which is preferably a capacitor. By a correct choice of the capacitor, 74, the auxiliary winding voltage $V_s$ can be made 90° out of phase with V. Let $V_b$ represent the voltage applied to an individual bar of the motor stator. For the best results the number of turns in the main primary winding 50 equals V divided by 1.732 $V_b$. Also the number of turns in the auxiliary primary winding 51 equals $V_s$ divided by $3V_b$. This transformer is actually two transformers combined into one. The two transformers have common magnetic paths although they are independent of each other. Since the magnetic fluxes are 90° out of time phase, the combined magnetic path is smaller than it would have had to be if separate magnetic paths were used. Thus this arrangement involves the saving of space and makes possible a direct connection from the transformer secondary to the motor. This is of importance in the present invention where thousands of amperes are carried at a very low voltage.

The three phase transformer and motor described at the beginning of this specification can also be used on a single phase voltage source by using a similar split phase arrangement in the primary side of the transformer. It is only necessary to modify the number of turns and connections of the primary winding of the transformer while the secondary conductors of the transformer and the motor can be left as they are in the three phase connection.

Figures 11 and 12 show the end connections of a motor according to our invention having twelve slots with one conductor per slot. This motor can be constructed with great simplicity and yet it offers both of the advantages of distributed windings. The bars $a$ to $l$ inclusive are cross connected in pairs, i. e., $a$ and $l$ to $f$ and $g$, $b$ and $c$ to $i$ and $h$, and $d$ and $e$ to $j$ and $k$. At the other end, the straps 61 and 62 provide an interconnection constituting the neutral point. As seen in Figure 12, the pairs of bars may be connected by cross pieces 63 to which the bars 64 are attached. Bars 64 take the place of bars 14 of Figure 1.

This motor is an alternative to the 6 slot motor previously described and is similar to it in every respect except for the number of slots and the stator connections. This alternate construction is intended to show that our invention is not limited to one stator connection, as there are many possibilities with different numbers of slots, observing the same principles set forth in the claims.

The transformers and motors described above have been described with particular reference to motors and transformers intended for use in deep well installations. It should be borne in mind that submersible motors have application in other than deep wells and in such other fields the particular shape of the motors need not be as shown herein. Motors embodying the principles of our invention which are intended for other uses may be very similar in appearance to conventional motors. Of course, the motor and transformer may again be designed to be fitted together in a manner similar to that described above so that the motor and transformer together would constitute substantially a single unit.

While the method of connecting motors and transformers together wherein the motor bars telescope within the transformer is of great advantage, it will be clear that motor and transformer may be connected together in other ways. For example, in Figure 13 where a motor is indicated generally at 70 and a transformer at 71, the connection between the two may be made by braided cable 72 with the two clamping means 73.

It will be clear that numerous modifications in detail may be made without departing from the spirit of our invention. We do not desire to limit ourselves to single-phase or any particular polyphase type of wiring. The construction shown herein is to be regarded as exemplary only and we do not intend to limit ourselves in any way other than as set forth in the claims which follow.

Having now fully described our invention, what we claim as new and desire to secure by Letters Patent is:

1. In combination: a transformer having a primary and a single turn secondary, said secondary comprising tubes of electrically conductive material, means for supplying a voltage to be transformed to said primary, said entire transformer, except for said supply means and said tubes being sealed; and an electric motor having a number of single turn field windings, said windings comprising bars of electrically conductive material, some of which are of a size to telescope snugly into the tubes constituting the secondary of said transformer, said last named bars extending from one end of said motor, said motor operating on a very low voltage and being capable of submerged operation without sealing.

2. In combination: a transformer comprising an elongated core of Y shape in cross-section, a primary winding on each arm of said Y, a single turn secondary for each of said arms, said secondaries being connected at one end and insulated from each other at the other end, said secondaries comprising tubes of conductive material; and an electric motor having single turn field windings, said field windings comprising heavy bars of electrically conductive materials some of which are of a size to telescope snugly into the tubes constituting the secondaries of said transformer, said bars being connected together at one end and insulated from each other at the other end; said transformer being entirely sealed whereby it may operate submerged, and said motor operating on very low voltage whereby it may also operate submerged.

3. In combination: a transformer comprising an elongated core of Y shape in cross section, a primary winding on each arm of said Y, a tube associated with each of said arms; and an electric motor having single turn field windings, said field windings comprising heavy bars of electrically conductive material, some of which extend from one end of said motor and are of a size to telescope snugly into the said tubes to constitute the secondaries of said transformer, means for connecting said extending bars together at one end, means to insulate said bars from each other at the other end; said transformer being entirely sealed whereby it may operate submerged, and said motor operating on a very low voltage whereby it may also operate submerged.

TOM C. LLOYD.
SHELDON S. L. CHANG.

REFERENCES CITED

The following references are of record in the file of this patent:

UNITED STATES PATENTS

| Number | Name | Date |
|---|---|---|
| 526,083 | Wagemann | Sept. 18, 1894 |
| 1,578,831 | Duncan | Mar. 30, 1926 |
| 1,896,328 | Pohl | Feb. 7, 1933 |
| 2,480,576 | Helper | Aug. 30, 1949 |
| 2,497,522 | Walker | Feb. 14, 1950 |
| 2,500,802 | Clark | Mar. 14, 1950 |

FOREIGN PATENTS

| Number | Country | Date |
|---|---|---|
| 10,655 | Great Britain | of 1912 |
| 388,604 | Great Britain | Mar. 2, 1933 |
| 530,038 | France | Sept. 23, 1921 |